United States Patent [19]

Heitmann et al.

[11] 4,447,143
[45] May 8, 1984

[54] REFLEX CAMERA WITH ELECTRONIC RANGE FINDER

[75] Inventors: Knut Heitmann, Wetzlar; Klaus-Dieter Schaefer, Braunfels, both of Fed. Rep. of Germany

[73] Assignee: Ernst Leitz Wetzlar GmbH, Wetzlar, Fed. Rep. of Germany

[21] Appl. No.: 447,166

[22] Filed: Dec. 6, 1982

[30] Foreign Application Priority Data

Dec. 24, 1981 [DE] Fed. Rep. of Germany ....... 3151289
Mar. 18, 1982 [DE] Fed. Rep. of Germany ....... 3209908

[51] Int. Cl.$^3$ ............................................. G03B 3/00
[52] U.S. Cl. ..................................... 354/407; 354/478
[58] Field of Search ............... 354/402, 406, 407, 478, 354/429

[56] References Cited

U.S. PATENT DOCUMENTS 3,953,728  4/1976  Leitz et al. ......................... 354/407

Primary Examiner—Michael L. Gellner
Attorney, Agent, or Firm—Schwartz, Jeffery, Schwaab, Mack, Blumenthal & Koch

[57] ABSTRACT

Disclosed is a reflex camera having a range finder assembly consisting of a focussing disk, field lens, pentaprism and eyepiece and having an electronic range finder wherein the imaging lens of the reflex camera projects an image of the object to be photographed onto a grating which is arranged in an image plane of the imaging objective lens and which acts as a spatial frequency filter. This image is projected through the pentaprism by means of a fully reflecting concave mirror ground onto the lower edge of the exit surface of the pentaprism. A photoelectric receiver system is associated with the grating, and a reflecting grooved grating is provided as the spatial frequency filter. The groove plane is arranged parallel or obliquely with respect to the image plane, so that the partial beams created by the splitting of the principal beam on the reflecting grooved grating are reflected back in the direction of the top edge surfaces of the pentaprism.

16 Claims, 8 Drawing Figures

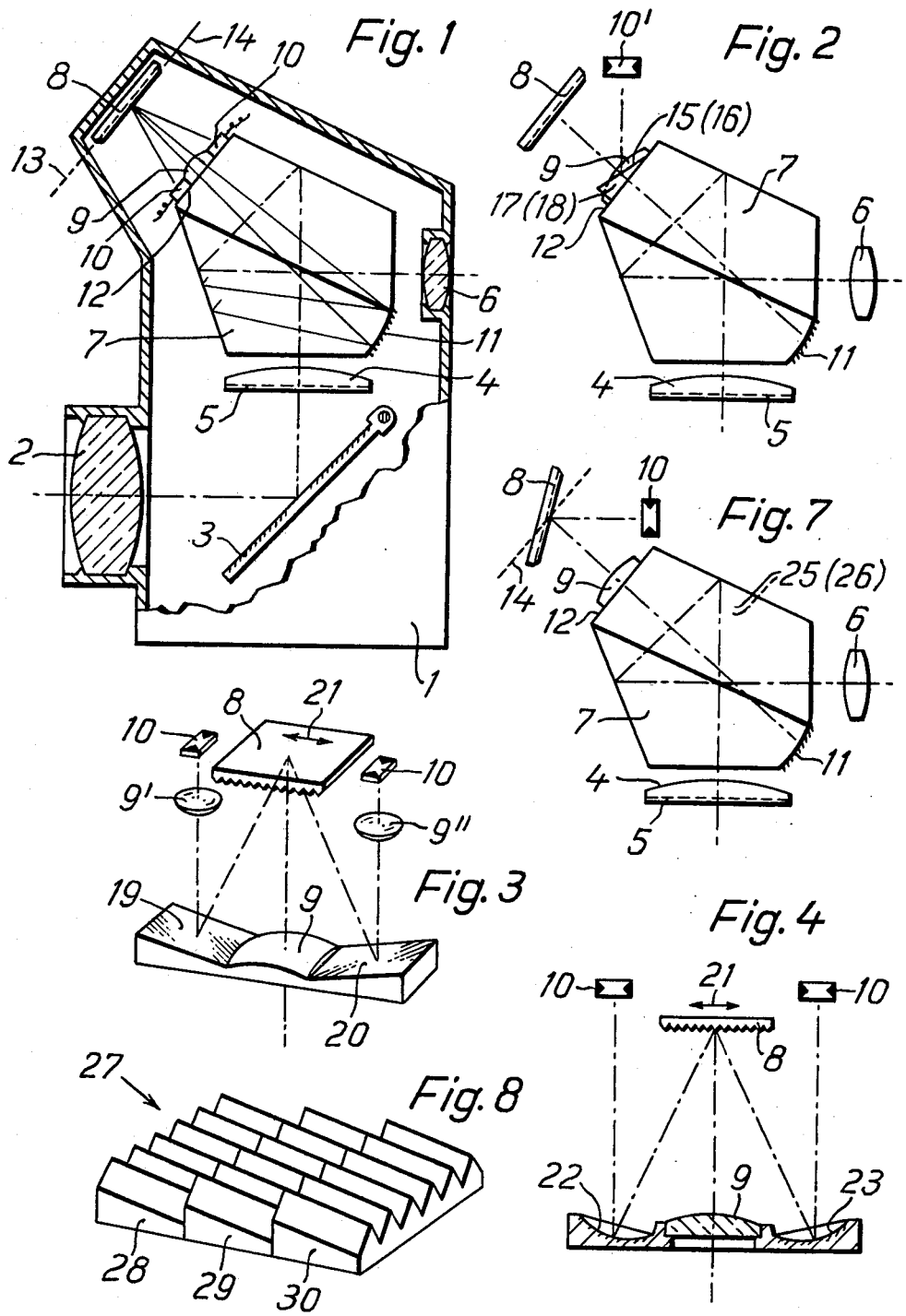

REFLEX CAMERA WITH ELECTRONIC RANGE FINDER

BACKGROUND OF THE INVENTION

The present invention relates to a single lens reflex camera and more especially to a single lens reflex camera having a view finder assembly comprised of the focussing disk, pentaprism and eyepiece and having an electronic range finder.

Range finder devices of this type in reflex cameras are known. For example, there is described in DE-OS No. 27 31 192 a device in which the imaging lens of the reflex camera projects by means of a fully reflecting concave reflector, which is ground onto the lower edge of the exit surface of the pentaprism, an image of the object to be photographed onto a grating which is located in one image plane of the imaging lens and acts as a spatial frequency filter. The grating is located (in the direction of the light) behind the triangular, frontal apex or roof surface of the pentaprism. The photoelectric receivers of the system follow it in sequence. This layout requires a bulky covering cap on the camera which is unattractive in appearance.

In order to eliminate this disadvantage, it has already been proposed to laterally deflect the path of the measuring beam after the grating, with deflecting means, such as, for example, mirrors or a prism. This, however, leads to a lack of symmetry of the cover of the camera. Furthermore, the realization of such a configuration requires a series of critical structural elements.

SUMMARY OF THE INVENTION

It is therefore an object of the present invention to provide an improved single lens reflex camera.

It is a further object of the invention to provide an improved electronic range finder for a reflex camera.

It is a particular object of the invention to provide an electronic range finder which, because of its simple and space saving configuration, can be placed into a camera, without the need to substantially alter the conventional outward appearance of the camera.

In accomplishing the foregoing objects, there has been provided in accordance with the present invention an electronic range finder for a reflex camera having an objective lens and a mirror means for reflecting an image of an object to be photographed toward the range finder. The range finder comprises a grating located in an image plane of the objective lens; a pentaprism having a fully reflecting concave mirror formed on the lower edge of its exit surface, for projecting an image of the object to be photographed upon the grating; and an electronic photoelectric receiver system positioned to receive light reflected from the grating. The grating comprises a grooved reflecting grating capable of functioning as a spatial frequency filter. The grooves of the grating being shaped so as to split the image light beam into partial beams and the groove plane of said grating being arranged at an angular orientation with respect to the image plane in which the grating is located predetermined in order to reflect said partial beams in a path leading to said receiver system.

In one embodiment, the groove plane of the grating is parallely oriented to the image plane in which the grating is located to reflect said partial beams back in the direction of the incident image light beam.

In another embodiment, the groove plane of the grating is arranged at an angle to the image plane in which the grating is located, the grooves of the grating being shaped so as to split the image light beam into partial beams and to reflect the partial beams in the direction of the roof edge surfaces of the pentaprism. Preferably, the grooved grating is capable of preferentially reflecting light of a predetermined wave length.

In another aspect of the present invention, there has been provided a reflex camera, comprising an objective lens; an electronic range finder; and a mirror means for reflecting an image of an object to be photographed toward the range finder, wherein said range finder comprises the electronic range finder as defined above.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIG. 1 is a schematic cross-sectional view through a reflex camera having an electronic range finder according to the invention;

FIGS. 2 to 4 schematically illustrate embodiments of the deflection of the partial beams reflected by the grooved grating according to the invention;

FIG. 7 is a schematic representation of the configuration of an electronic range finder having a reflecting grooved grating arranged at an angle to the image plane; and FIG. 8 is a perspective view of a reflecting grooved grating composed of strips, wherein the strips are tilted in the same direction, by the same angle.

DETAILED DESCRIPTION OF PREFERRED EMBODIMENTS

Figure 5:
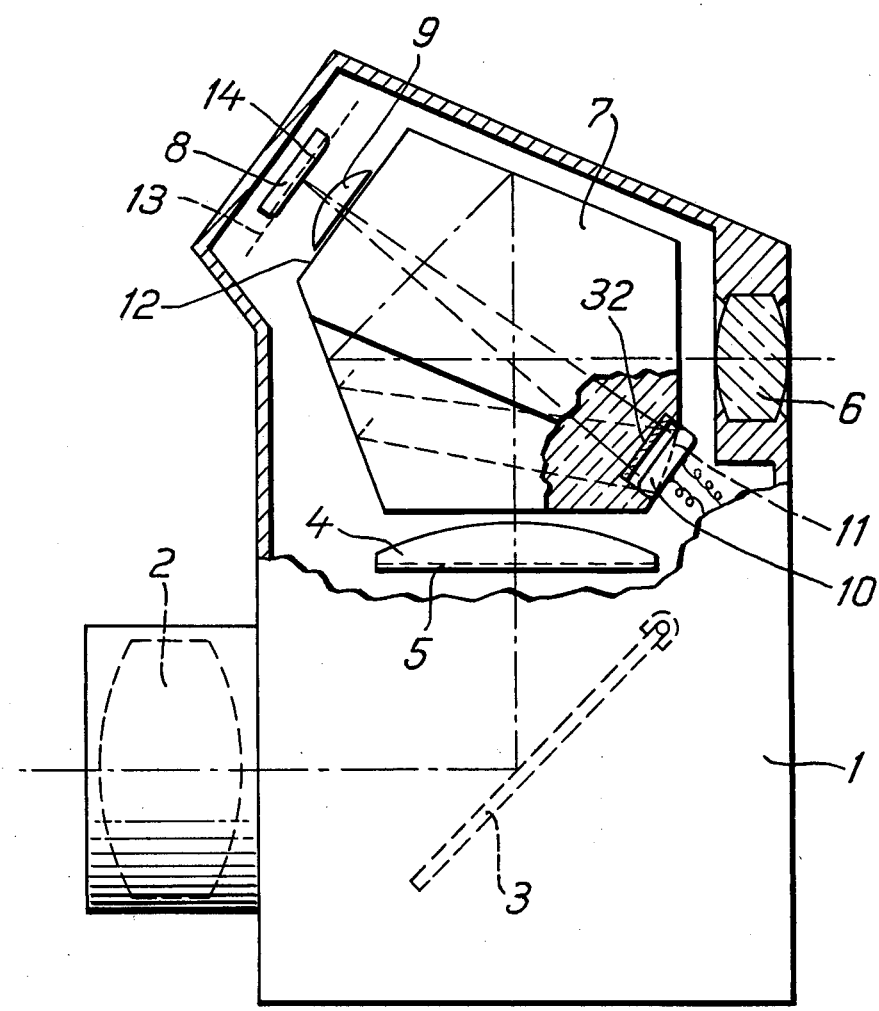
FIG. 5 is a cross-sectional view through a reflex camera having the new electronic range finder.

In the case of a reflex camera of the aforementioned type, wherein by means of a fully reflecting concave reflecting mirror ground onto the lower edge of the exit surface of the pentaprism, the imaging lens projects an image of the object to be photographed through the pentaprism onto a grating which is arranged in an image plane of the imaging lens, which acts as a spatial frequency filter, and which is followed by a photoelectric receiver system, the invention provides a reflecting grooved grating having its groove plane arranged either parallel to the image plane or at an angle to it, so that the partial beams generated by splitting of the principal beam are reflected in the direction of the incident light or in the direction of the apex edge surface of the pentaprism.

In the drawings the invention is illustrated schematically by means of exemplary embodiments, with reference to which it is described in more detail hereinbelow.

In FIG. 1, the reference numeral 1 designates a schematically represented housing of a reflex camera. As is conventional, the camera has an objective lens 2 and a pivotable reflecting mirror 3. Above the reflecting mirror 3 there is located a focussing disk 5 which forms a single piece with a field lens 4. The objective 2 projects onto the focussing disk an image of the object to be photographed. This image is viewed by the camera user by means of an eyepiece 6 acting as a magnifier through a pentaprism 7. The dimensions of the pentaprism and its angles are chosen in cameras of this type so that the optical axis of the objective lens 2, after a twofold deflection, exits to the rear from the camera housing 1 essentially parallel to its path in the objective 2. The eyepiece 6 is arranged so that its optical axis coincides essentially with the exiting optical axis of the objective 2. The light path between the objective 2 and the ocular 6 is generally designated as the view finder beam.

The camera shown is illustrated with an electronic range finder, the essential components of which are a grating 8 acting as a spatial frequency filter, a field lens 9 and the photoelectric receiver systems 10. The mode of operation of such range finders is conventional and is described in detail, for example, in DE-OS No. 22 01 092 and DE-OS No. 23 56 757. The specific configuration of the range finder, which is the subject matter of the present invention, is described hereinbelow.

For the functioning of the electronic range finder it is necessary that an image of the object to be photographed be projected onto the grating 8. For this purpose (as described in German applications P 27 31 192.8 and P 30 47 184.4) part of the view finder beam is split off as the measuring beam from the view finder beam by a division of the pupil of the objective 2, with said partial beam being projected onto the grating 8 by means of a fully reflecting concave reflector 11 ground onto the lower edge of the exit surface of the pentaprism 7.

In order to obtain a simple, space saving configuration of the electronic range finder, the grating 8 is in the form of a reflecting grooved grating and the field lens 9 is arranged on an exit surface 12 located opposite the concave mirror 11. The beam split off from the pupil of the objective and essential for the range finding function is projected by the field lens 9 onto the reflecting grooved grating 8. This grating 8 is displaced by means of a drive, not shown, in a vibratory movement perpendicular to the plane of the drawing, with its groove plane 13 running parallel to the image plane. It divides the projected beam into two partial beams, which are reflected in the direction of the light incidence. The angle included by the flanks of the grooves is chosen so that the partial beams reflected by the grooved reflecting grating 8 travel outside the incident beam and preferably symmetrically with respect to it.

The photoelectric receiver systems 10 mounted around the field lens 9 on the surface 12 of the pentaprism 7 are impacted by the reflected partial beam and produce measuring signals.

FIG. 2 illustrates another embodiment of the new electronic range finder. Here, the partial beams reflected by the grooved reflecting grating 8 back in the direction of the incoming light impact the totally reflecting surfaces 15 (16) of wedge prism 17 (18), which deflect them onto the photoelectric receiver systems 10.

Another possible mode of deflection of the partial beams reflected by the reflecting grooved grating 8 is shown in perspective in FIG. 3. For reasons of clarity, only one reflecting grooved grating 8, the field lens 9, deflecting means and the photoelectric receiver systems 10 are shown. The deflecting means here consist of mirrors 19 and 20 arranged obliquely with respect to the axis of the light incidence; they may also be formed integrally with the field lens 9. The direction of motion of the reflecting grooved grating 8 is indicated by the double arrow 21. Additional optical elements 9' and 9" may optionally be arranged in front of the photoelectric receiver system 10. These are, e.g., lenses or equivalent optical structural elements, which effect a further deflection of the partial beams of light.

The deflection of the partial beams may also be effected according to FIG. 4. As shown schematically, the field lens 9 is flanked by fully reflecting concave mirrors 22, 23, which deflect the partial beams reflected by the reflecting grooved grating onto the photoelectric receiver systems 10. The direction of motion of the grating is again indicated here by the double arrow 21.

In order to obtain an even more space-saving configuration, in FIG. 5, in contrast to the preceding arrangement, the photoelectric receiver systems 10 are arranged adjacent to the concave mirror 11. It is possible to thereby mount the grating 8 very close behind the exit surface 12 of the pentaprism 7 and to reduce the required volume of the layout.

The mode of operation of this embodiment of the invention is as follows: by the action of the field lens 9 located in the view finder focussing plane, there is produced at the location of the concave mirror 11 an image of the exit pupil of the objective 2, from which the concave mirror 11 blocks out a portion and reflects it toward the reflecting grooved grating 8. There, the image to be analyzed is produced. The light incident on the reflecting grooved grating 8 is reflected, as described above, back in the direction of the concave mirror 11, by the splitting angle defined by the inclination of the groove. With the cooperation of the field lens 9 located practically on the reflecting grooved grating 8, there are created adjacently to the concave mirror 11, two images of said mirror, which are located on the photoelectric receiver systems 10, which are arranged in pairs.

With the assumption that the image of the objective pupil fills the concave mirror 11 exactly, two pupil images of equal size are obtained, the light beams of which oscillate back and forth when the reflecting grooved gratings are moving. These light beams are converted into electrical signals by the photoelectric receiver systems 10, and these signals are evaluated in the known manner. However, this assumption of two pupil images of equal size is in practice almost never achieved. A precondition would be that the diaphragms of all of the lenses which may be mounted on the camera always produce a pupil image of equal size and shape in the area of the concave mirror 11. This is technically feasible, but is generally not true. Rather, it must be assumed that the concave mirror 11 in fact splits out only a part of the image exiting from the pupil of the objective 2, so that therefore the two partial pupil images projected by the reflecting grooved mirror have light superposed on them from other areas of the exit pupil of the objective. This superposition leads to an additional, falsifying impact of light on the photoelectric receiver systems 10, and thus potentially to incorrect measurements.

However, the light beams resulting from the reflection from the oscillating reflecting grooved grating 8 differ significantly from those originating in the mirroring of the view finder beam by the surfaces of the pentaprism 7. The former are modulated in time by the oscillating motion of the reflecting grooved grating 8.

For the evaluation of the measuring signals, only their variation in time and not their static average is significant. It is thus possible to eliminate irrelevant portions of the signal by means of conventional electrical circuitry, which is not disclosed here in more detail.

It is also possible to utilize the fact that the light incident from the objective 2 impacts the photoelectric receiver system 10 at an angle different from that of the light arriving by way of the reflecting grooved grating 8. For this purpose a louver-type strip diaphragm 32 (FIG. 5) may be arranged in front of the photoelectric receiver system 10, which serves to weaken the directly impacting, interfering constant light.

Figure 6:
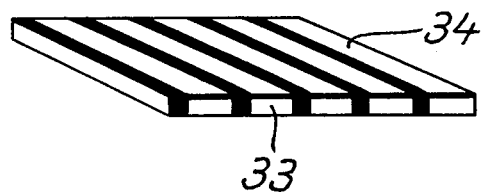
FIG. 6 is a detailed perspective view of a louver-type diaphragm according to the invention.

An embodiment of such a strip diaphragm 32 is shown in FIG. 6. It may be made, for example, of narrow strips 33 of a transparent material placed over each other in the manner of a sandwich, with layers 34 of a material which is suitably light absorbent positioned in between the transparent strips. If dimensioned correctly, such a strip diaphragm transmits light only if the incident light is nearly perpendicular. The effect of the diaphragm increases with smaller angles of the incidence of light. It is therefore feasible to obtain the shutter effect desired by the specific dimensioning of the strips 33 and/or the layers 34.

As shown in FIG. 7, it is also possible to obtain a deflection of the partial beam leaving the reflecting grooved grating 8 by inclining the grating 8 relative to the image plane 14. In this case, the reflected partial beams are guided in the direction of the top edge surfaces 25 (26) of the pentaprism 7. The grating plane is in an oblique position with respect to the image plane 14. In case of an extended grating, this leads to a reduction in measuring accuracy, since the grating acquires a quasi increase in depth. This loss of accuracy may be countered by constructing the reflecting grooved grating only in the form of a narrow strip. This measure further increases the sensitivity of the electronic range finder for obliquely located structures, but it also has the effect of worsening the energy balance.

The energy balance may be improved by means of a grating according to FIG. 8. The reflecting grooved grating 27 shown here consists of a plurality of grooved grating strips 28, 29, 30. The grooved grating strips 28, 29, 30 are tilted in the direction of light incidence by the same angle, so that corresponding points on the grating strips 28, 29, 30 define a common plane. The grating 27 is aligned so that the center lines of the grating strips 28, 29, 30 are located exactly in the image plane 14. Analogous to the known Fresnel lenses, a grating is obtained in this manner which, in spite of its quasi planar configuration, exhibits a deflection not only in the two principal directions of reflection, but also in a direction inclined with respect to incidence plane.

What is claimed is:

1. An electronic range finder for a reflex camera having an objective lens and a mirror means for reflecting an image of an object to be photographed toward the range finder, said range finder comprising:
   a grating located in an image plane of the objective lens;
   a pentaprism having a fully reflecting concave mirror formed on the lower edge of its exit surface, for projecting an image of the object to be photographed upon said grating;
   an electronic photoelectric receiver system positioned to receive light reflected from said grating; and
   wherein said grating comprises a grooved reflecting grating capable of functioning as a spatial frequency filter, the grooves of said grating being shaped so as to split the image light beam into partial beams and the groove plane of said grating being arranged at an angular orientation with respect to the image plane in which the grating is located predetermined in order to reflect said partial beams in a path leading to said receiver system.

2. An electronic range finder according to claim 1, wherein the groove plane is parallely oriented to said image plane to reflect said partial beams back in the direction of the incident image light beam.

3. An electronic range finder according to claim 1, wherein said grooved grating is capable of reflecting light with a predetermined wave length in a preferred manner.

4. An electronic range finder according to claim 3, wherein the flanks of the grooves of said grating are inclined at an angle with respect to each other, such that the partial beams reflected by said grating are located outside the incident image beam.

5. An electronic range finder according to claim 1, further comprising at least one additional light deflecting element positioned in the path of the beam between the grooved grating and the photoelectric receiver system.

6. An electronic range finder according the claim 1, comprising two photoelectric receiver systems arranged adjacently to the concave mirror of the pentaprism.

7. An electronic range finder according to claim 6, further comprising a diaphragm positioned in front of each photoelectric receiver system for eliminating constant light components in the partial beams.

8. An electronic range finder according to claim 7, wherein each diaphragm comprises a louver-type configuration.

9. A reflex camera, comprising:
   an objective lens;
   an electronic range finder; and
   a mirror means for reflecting an image of an object to be photographed toward the range finder, wherein said range finder comprises the electronic range finder as defined by claim 1.

10. An electronic range finder according to claim 1 for a reflex camera, wherein the groove plane of said grating is arranged at an angle to the image plane in which said grating is located, the grooves of said grating being shaped so as to split the image light beam into partial beams and to reflect the partial beams in the direction of the roof edge surfaces of said pentaprism.

11. An electronic range finder according to claim 10, wherein said grooved grating comprises a plurality of grooved grating strips arranged adjacent to each other transversely to the direction of their grooves.

12. An electronic range finder according to claim 11, wherein said grating strips are tilted with respect to the direction of the incident image beam in the same direction and by the same angle, so that corresponding points of the grating strips define a common plane.

13. An electronic range finder according to claim 1, further comprising a single field lens positioned in front of the reflecting grooved grating.

14. An electronic range finder according to claim 1, further comprising a plurality of said photoelectric receiver systems and an optical collecting element arranged in the partial beam to each of said receiver systems.

15. An electronic range finder according to claim 10, further comprising a single field lens positioned in front of the reflecting grooved grating.

16. An electronic range finder according to claim 10, further comprising a plurality of said photoelectric receiver systems and an optical collecting element arranged in the partial beam to each of said receiver systems.

* * * * *